Dec. 10, 1935.            A. PREEDIT              2,024,062
                         ELECTRIC ROASTER
                        Filed Nov. 19, 1934
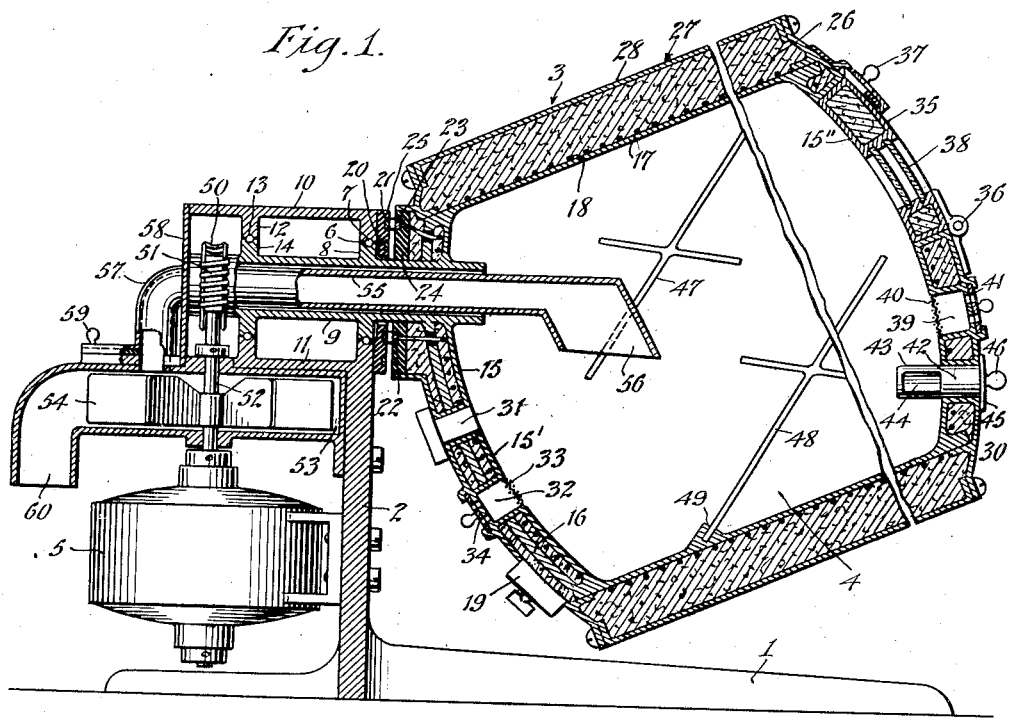
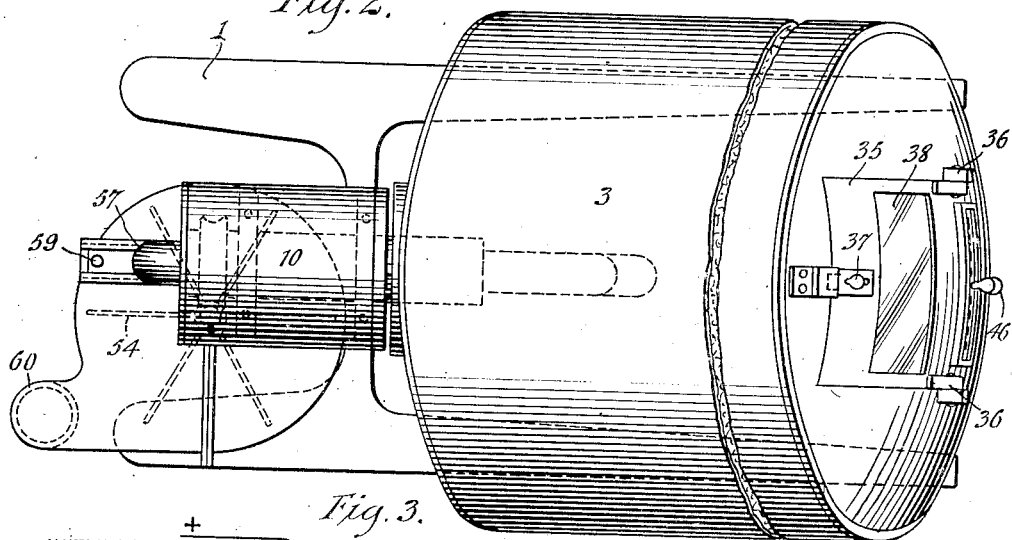
INVENTOR
Anton Preedit Patented Dec. 10, 1935

2,024,062

UNITED STATES PATENT OFFICE 2,024,062

ELECTRIC ROASTER

Anton Preedit, Erie, Pa.

Application November 19, 1934, Serial No. 753,757

3 Claims. (Cl. 34—5)

This invention relates to roasting machines and has for an object to provide an improved electric roaster wherein a proper temperature may be maintained for roasting different articles and, at the same time, the articles may be stirred.

Another object of the invention is to provide an electric roaster wherein means are provided for causing a supply of air to be admitted to produce a desired oxidization of the product being roasted.

An additional object of the invention is to provide a roasting machine which is adapted to be rotated during operation and which is electrically heated, the parts being so arranged that the gases evolved from the matter being roasted may be retained in the machine or removed therefrom.

An additional object more specifically is to provide an electric roaster which may be round, square, or other shape, and which is provided with sampling means and regulating dampers and windows for inspecting the interior at any time, as well as with means for withdrawing gases from the roasting chamber.

In the accompanying drawing—

Figure 1 is a longitudinal vertical sectional view through a roaster disclosing an embodiment of the invention;

Fig. 2 is a top plan view of the roaster shown in Fig. 1;

Fig. 3 is a diagram illustrating how current is led in from the source to the heating element.

Referring to the drawing, 1 indicates what might be termed a horseshoe base having an upright or standard 2, to which the various moving and other parts are secured. Arranged on one side of the upright 2 is a drum 3, which is provided with a roasting chamber 4, and on the opposite side of the upright 2 is an electric motor 5 and certain other parts hereinafter described. The upright 2 is preferably provided with an aperture 6, which has a groove for receiving ball bearings 7, which ball bearings also engage a flange 8 of a sleeve 9. Lateral extensions 10 and 11 are provided, the same being preferably integral with the upright 2. These extensions are connected by an annular ring 12, having a groove for the reception of ball bearings 13, which ball bearings fit also in a groove in the flange 14 of the sleeve 9. By this construction, as clearly shown in Fig. 1, the sleeve 9 is rotatably supported. This sleeve extends through the upright 2 and is welded to certain parts of the drum 3, as, for instance, an inner casing or shell 15, and to a reinforcing plate 16. The shell 15 is provided with a tubular portion or section 17 welded to the respective ends, and arranged exteriorly of section 17 and the respective ends 15' and 15", are heating wires 18, which are connected up as shown in the diagram (Fig. 3) with a source of current through a control switch 19. This switch may be formed as a three-heat switch or any number of heats as desired.

As the drum 3 rotates as hereinafter fully described, the current is carried into the heating elements 18 through stationary slip rings 20 and 21 and through slip rings 22 and 23 carried by an insulating plate 24 rigidly secured in any desired manner to the drum 3. The rings 20 and 21 are mounted in an insulating plate 25 which is secured in any desired manner to the upright 2. As the ends 15' and 15" and the tubular section 17 are welded together, a comparatively strong and gas-tight structure is provided. Around these members are arranged suitable insulating members 26, said members 26 being of a size and shape to fit their particular place. The insulating material may be asbestos or any other suitable material and is arranged principally exteriorly of the heating elements 18, so that the heat may radiate inwardly and not outwardly. An outer casing 27 is arranged exteriorly of the insulation, said outer casing being provided with a tubular shell 28 and end members 29 and 30.

A suitable opening is provided in one end of the drum for a thermostat or thermometer 31, which may be of any desired kind; also one end of the drum 3 carries the switch 19. The thermometer 31 is arranged preferably centrally of the end, as shown in Fig. 1, so that it will give an indication of the average heat within the drum. A vent opening 32 is provided in the end carrying the thermometer, said vent opening having a screen 33 and a sliding shutter 34, whereby the opening may be closed whenever desired, or partly closed. The outer end of the drum 3 carries a door 35, hinged at 36, and held normally closed by a suitable lock or catch 37. A double glass window 38 is provided in the door 35 so that the material in the chamber 4 may be inspected whenever desired. An opening or passageway 39 is arranged adjacent the hinge 36, said passageway having a wire mesh 40 at the inner end and a slide shutter 31 at the outer end, whereby the passageway may be opened or closed or partly opened. A removable sampling member 42 is arranged adjacent the passageway 39, said sampling member comprising a drum 43 having an opening 44, a cover or lid 45, and a handle 46, whereby it may be slid in or out as desired. Suitable stirring members 47 and 48 are arranged within the chamber 4, the same being secured in place in any desired manner as, for instance, by being welded to the inner casing 15, as, for instance, at 49. These stirring members may be wires or bars of any kind so as to produce a stirring action as the drum 3 rotates.

In order to rotate the drum 3, the sleeve 9 which is rigidly secured to the drum, is provided with a worm wheel 50 continually meshing with a worm 51 rigidly secured to the shaft 52, which is secured to and rotated by the motor 5. The shaft 52 extends through the chamber 53 in which a fan 54 is mounted, said fan being rigidly secured to the shaft by a set screw or other suitable means so that whenever the motor is rotating the fan will also be rotating.

Arranged to extend through the sleeve 9 is a pipe 55, which has an enlarged discharge opening 56 positioned within the chamber 4 practically near the center thereof. This pipe has an extension 57 which extends through the end plate 58 and then downwardly so as to open into the chamber 53, and a slide valve or shutter 59 is arranged to vary the opening between the extension 52 and chamber 53.

When it is desired to leave the contents of the drum unmolested during the roasting operation, the shutters 34 and 41 are closed and also the shutter or valve 59. This will maintain the chamber 4 closed and allow the heat to perform its desired function. However, if it should be desired to remove the gases from the chamber, the valve or slide 59 may be opened and the gases will be drawn out by the fan 54 and discharged out through the opening 60. A suitable pipe may be connected at this opening 60 to lead the gases to the desired point for utilization, or, if preferred, a pipe may lead from the opening 60 so as to discharge the gases back into the chamber 4. When this is done, the sampler 42 is removed and the pipe connected in its place, a suitable washer being provided in the pipe to permit the drum to continue to rotate. Also, if it should be desired to oxidize any of the contents, the slide 41 could be opened completely or partly and the slide 59 opened completely or partly. This will cause a circulation of air through the chamber which will produce the desired oxidization in the presence of heat.

From the construction just described it will be evident that by opening the door 35, large quantities of any desired article may be inserted, as, for instance, coffee, beans, nuts, and various kinds of roots, blossoms, leaves, and barks, or other chemical producing articles. If desired, small quantities could be inserted at any time through the opening left when the sampler 42 is removed temporarily. In this way the taste or aroma of the roasted articles may be varied as desired, while the chaff, dust and other foreign matter may be readily drawn out through the pipe 55. If during the operation of the device a rarefaction is produced in the chamber 4, the heating action will continue and the desired results will be secured, although this may be stopped by shutting the slide 59 or opening either of the slides 38 and 41. The circulation of air in addition to producing an oxidizing effect on certain ingredients will produce a cooling effect so that the desired temperature may be maintained. It will also be evident that the control of the switch 19 may be varied to provide a variation in temperature.

The device may be made of any desired size but preferably is made comparatively small so that it may be used in the home as well as in the factory, and is completely self-contained. After securing the device it is merely necessary to place it on a table or other support and connect it to a suitable source of current. It is then in condition for operation.

I claim:

1. A roasting outfit including a support having a standard, a sleeve rotatably mounted on said support, a drum rigidly secured to said sleeve at one end thereof with its axis at an angle to the axis of the sleeve, power means for rotating said sleeve and drum, an air inlet valve at the opposite end of the drum to said sleeve, a stationary tube extending through said sleeve to a point substantially centrally of the drum, a fan for producing a suction in said tube, and valve means for varying the communication between the fan and the tube whereby when said air inlet valve has been opened to the desired extent air may be circulated through said drum during the time it is functioning.

2. A roaster including a tubular drum having a convex end and a door for charging and discharging, a supporting sleeve having one end portion rigidly secured to said convex end near the periphery thereof whereby when said sleeve is in a horizontal plane the axis of said drum will be at an angle to the horizontal, means for rotating said sleeve and drum whereby the contents of the drum will be caused to fall by gravity toward one end and then toward the other end as the drum rotates, a stationary tube extending through said sleeve to a point within said drum, and means for drawing gases out of said drum through said tube.

3. A roaster, including a base having a supporting upright, a sleeve rotatably mounted in said upright and projecting therefrom, a drum having an inner casing and an end rigidly secured to said inner casing and also rigidly secured to said sleeve, said sleeve being secured to said end near the periphery thereof, the axis of said sleeve being at an angle to the axis of said drum so that as the sleeve rotates it will rotate the drum and thereby cause the contents to move back and forth from one end of the drum to the other, a heating element carried by said drum immediately exteriorly of said inner casing, a reinforcing plate at the end of the drum secured to said sleeve, said reinforcing plate being also rigidly secured to said end and said inner casing, said drum being provided with a charging and discharging door, power means connected with said sleeve for rotating the sleeve and drum, a stationary pipe extending through said sleeve into the drum and to a point beyond the sleeve, and suction means actuated by said power means for drawing gases through said pipe and discharging the same to the atmosphere.

ANTON PREEDIT.